(12) United States Patent
Ishida et al.

(10) Patent No.: US 7,574,033 B2
(45) Date of Patent: Aug. 11, 2009

(54) SHEET PAPER IDENTIFICATION DEVICE AND METHOD

(75) Inventors: Takeshi Ishida, Saitama (JP); Yasuyuki Kimura, Saitama (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 659 days.

(21) Appl. No.: 10/551,583

(22) PCT Filed: Mar. 31, 2004

(86) PCT No.: PCT/JP2004/004714

§ 371 (c)(1),
(2), (4) Date: Sep. 29, 2005

(87) PCT Pub. No.: WO2004/088599

PCT Pub. Date: Oct. 14, 2004

(65) Prior Publication Data

US 2006/0233432 A1 Oct. 19, 2006

(30) Foreign Application Priority Data

Mar. 31, 2003 (JP) .............................. 2003-094763

(51) Int. Cl.
*G06K 9/00* (2006.01)

(52) U.S. Cl. ............................ 382/135; 270/37; 355/75

(58) Field of Classification Search .................. 382/135, 382/141, 136–140; 270/37; 355/75
See application file for complete search history.

(56) References Cited

U.S. PATENT DOCUMENTS 5,214,470 A * 5/1993 Denber ........................ 355/75
5,301,786 A * 4/1994 Yoshihara .................... 194/207

FOREIGN PATENT DOCUMENTS

| DE | 195 17 194 A1 | 11/1996 |
| JP | 01-250050 | 10/1989 |
| JP | 06-203244 | 7/1994 |
| JP | 11-102456 | 4/1999 |
| JP | 2002-092683 | 3/2002 |
| JP | 2002-183722 | 6/2002 |

* cited by examiner

*Primary Examiner*—Aaron W Carter
(74) *Attorney, Agent, or Firm*—Fish & Richardson P.C.

(57) ABSTRACT

There are provided a sheet paper identification device and method capable of preventing use of the device in an abnormal state by preventing erroneous identification caused by dust attached to an interior of a pickup section, detecting the abnormal state in the pickup section due to the dust, and notifying it outside. When a sheet paper is inserted from a sheet paper insert section (3), the sheet paper is fed by a sheet paper feed section (4). An image pickup section (7) images the interior of the image pickup section (7) before the sheet paper is fed to the image pickup section (7) so as to acquire image data without any sheet paper so as to acquire image data having the sheet paper. A dust detection section (8) calculates the position and the area of the image indicating dust of the image data having no sheet paper. When the image data having the sheet paper has an image of the same area at the same position as the image indicating the dust, the image is identified as an image indicating the dust attached to the interior of the image pickup section (7) in the image data including the sheet paper. If the dust identified is other than a predetermined one, an abnormal state of the image pickup section (7) is notified to a control section (2).

8 Claims, 9 Drawing Sheets

SHEET PAPER IDENTIFICATION DEVICE AND METHOD

TECHNICAL FIELD

The present invention relates to a sheet paper identification device and method and, more particularly, to a sheet paper identification device and method that identify the type and authenticity of sheet paper by extracting characteristics of the sheet paper via an image.

BACKGROUND ART

Generally, the identification of the type and authenticity of the sheet paper of bank notes, checks or gift certificates or the like employs a magnetic sensor or light sensor and is performed by magnetically or optically extracting the characteristics of sheet paper that is inserted by the user.

The extraction of the optical characteristics of sheet paper using a light sensor acquires an image pattern of the sheet paper by acquiring an image pattern by extracting the design, dimensions and orientation and so forth of sheet paper by using a transmission-type or reflective type light sensor, and identifies the type and authenticity of the inserted sheet paper by comparing the acquired image pattern with a standard pattern of a genuine bill for each type.

Here, in order to reduce the effects of noise caused by dirt or the like attached to the sheet paper, there are counterfeit bill identification devices or the like that identify whether a bill is genuine or counterfeit by reading a transparent pattern of a bill by means of two optical reading means that utilize transmitted light and reflected light and comparing both data sets thus read, as disclosed in Japanese Patent Application Laid Open No. 2002-92683, for example.

Further, as disclosed in Japanese Patent Application Laid Open No. H6-203244, there are counterfeit medium discrimination devices that discriminate between genuine and counterfeit media by reading an image of a medium by means of a CCD sensor by using transmitted light, extracting a pattern of a transparent area of the medium from the image thus read, and removing the effects of nonlinear blurring of the extracted pattern data.

However, in the conventional technologies cited above, even when dust is attached to the interior of an image pickup section, the existence of the dust is not identified and identification based on the picked up sheet-paper image is performed. Therefore, there is the inconvenience that erroneous identification or the like caused by dust arises and the sheet paper identification device is used while identification is not performed correctly and acceptance of the sheet paper is no longer possible instead of the abnormal state in the image pickup section caused by dust being communicated to the outside.

DISCLOSURE OF THE INVENTION

Therefore, an object of the present invention is to provide a sheet paper identification device and method capable of preventing erroneous identification caused by dust being attached to the interior of the image pickup section and preventing use of the device in an abnormal state by sensing the abnormal state in the image pickup section caused by the attached dust and communicating the abnormal state to the outside.

In order to achieve the above object, one aspect of the invention is a sheet paper identification device that images an image of sheet paper by means of an image pickup section and identifies the sheet paper on the basis of the image thus imaged, comprising first image acquisition means for acquiring a first picked-up image in a state where there is no sheet paper in the image pickup section; second image acquisition means for acquiring a second picked-up image in a state where there is sheet paper in the image pickup section; unwanted image discrimination means for discriminating an unwanted image in the second picked-up image on the basis of the first picked-up image acquired by the first image acquisition means and the second picked-up image acquired by the second image acquisition means; and sheet paper identification means for identifying the sheet paper on the basis of the second picked-up image acquired by the second image acquisition means and the unwanted image discriminated by the unwanted image discrimination means.

Here, an unwanted image is an image showing dust attached to the interior of the image pickup section.

Furthermore, another asppect of the invention is the sheet paper identification device, wherein the image pickup section comprises irradiation means for irradiating the sheet paper; a feed path for feeding the sheet paper; and image pickup means for imaging transmitted light of the sheet paper on the feed path.

Further, another asppect of the invention is the sheet paper identification device, wherein the unwanted image discrimination means comprise measurement means for measuring the position and area of an image in the first picked-up image acquired by the first image acquisition means, and the unwanted image discrimination means discriminate an image that exists in the second picked-up image acquired by the second image acquisition means in the same position and over the same area as the image measured by the measurement means as an unwanted image.

Moreover, another asppect of the invention is the sheet paper identification device, wherein the sheet paper identification means attach the unwanted image discriminated by the unwanted image discrimination means to standard data found beforehand from genuine sheet paper in the same position and over the same area, and identify the sheet paper by comparing the standard data to which the unwanted image is attached with image data corresponding with the second picked-up image acquired by the second image acquisition means.

Further, another asppect of the invention is the sheet paper identification device, further comprising abnormal state communication means for communicating an abnormal state when the unwanted image discriminated by the unwanted image discrimination means exceeds a predetermined value that is preset.

Furthermore, another asppect of the invention is a sheet paper identification method that images an image of sheet paper by means of an image pickup section and identifies the sheet paper on the basis of the image thus imaged, comprising the steps of acquiring a first picked-up image in a state where there is no sheet paper in the interior of the image pickup section; acquiring a second picked-up image in a state where there is sheet paper in the image pickup section; discriminating an unwanted image in the second picked-up image on the basis of the first picked-up image and the second picked-up image; and identifying the sheet paper on the basis of the unwanted image thus discriminated and the second picked-up image.

Moreover, another asppect of the invention is the sheet paper identification method, wherein the image pickup section irradiates light onto the sheet paper and images transmitted light of the sheet paper on the feed path for feeding the sheet paper.

Furthermore, another aspect of the invention is the sheet paper identification method, wherein the position and area of the image in the first picked-up image are measured and an image that exists in the second picked-up image in the same position and over the same area as the measured image is discriminated as an unwanted image.

In addition, another asppect of the invention is the sheet paper identification method, wherein the unwanted image is attached in the same position and over the same area to the standard data found beforehand from genuine sheet paper and the sheet paper is identified by comparing standard data to which the unwanted image is attached with image data that corresponds with the second picked-up image.

Further, another asppect of the invention is the sheet paper identification method, wherein an abnormal state is communicated when the unwanted image exceeds a predetermined value that is preset.

The present invention affords the effects of making it possible to prevent erroneous identification that occurs as a result of attached dust by imaging the interior of the image pickup section before imaging the sheet paper and correctly identifying the dust attached to the interior of the image pickup section and making it possible to prevent usage in an abnormal state of the image pickup section by sensing the abnormal state of the interior of the image pickup section and communicating the abnormal state to the outside.

BEST MODE FOR CARRYING OUT THE INVENTION

Embodiments of the sheet paper identification device and method according to the present invention will be described in detail hereinbelow with reference to the attached drawings.

Figure 1:
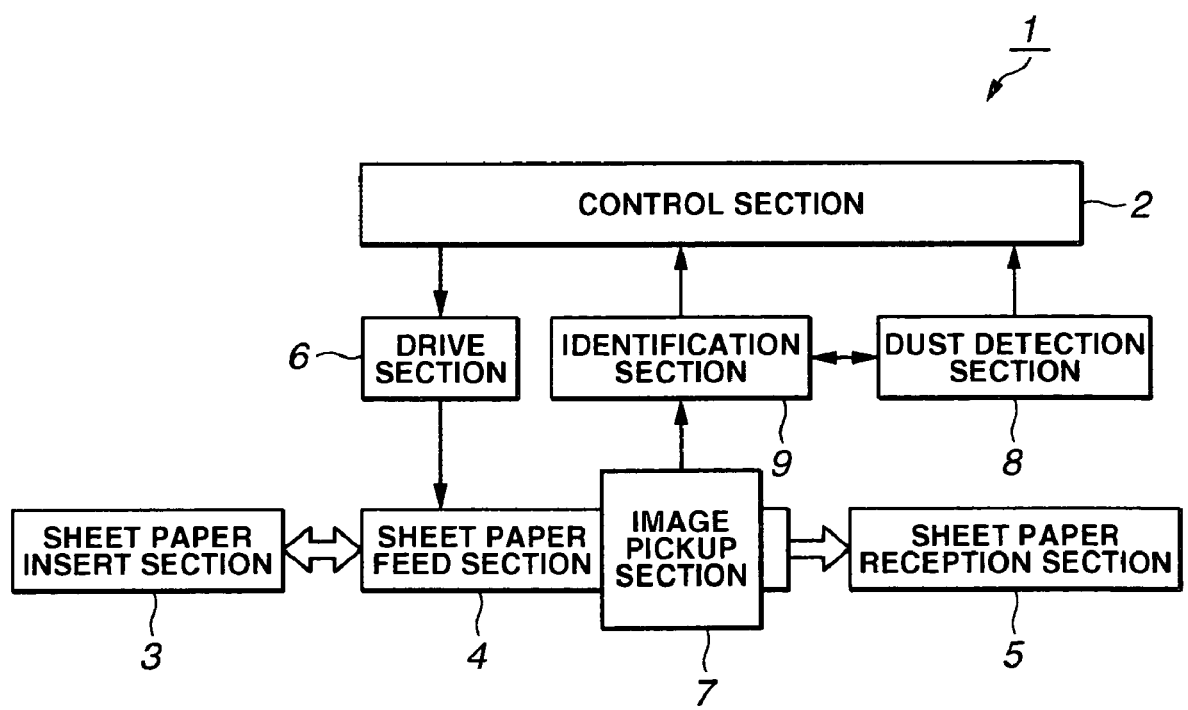
FIG. 1 is a block diagram showing an example of the functional constitution of the sheet paper identification device according to the present invention.

FIG. 1 is a block diagram showing an example of the functional constitution of a sheet paper identification device 1 according to the present invention.

As shown in FIG. 1, the sheet paper identification device 1 is constituted by a control section 2 that controls the whole of the sheet paper identification device 1, a sheet paper insert section 3, which is a sheet paper inlet, a sheet paper feed section 4 for conveying sheet paper, a sheet paper receipt section 5 for receiving sheet paper, a drive section 6 for driving the sheet paper feed section 4 by means of control by the control section 2, an image pickup section 7 for imaging sheet paper that is fed by means of the sheet paper feed section 4 and acquiring image data for the sheet paper, a dust detection section 8 for detecting dust attached to the interior of the image pickup section 7 from image data acquired by the image pickup section 7, and an identification section 9 for identifying the type and authenticity of the sheet paper on the basis of the image data acquired by the image pickup section 7.

The functional operation that is performed by the sheet paper identification device 1 when the type and authenticity of the inserted sheet paper are identified will be described next.

When sheet paper is inserted from the sheet paper insert section 3, the control section 2 feeds the sheet paper by means of the sheet paper feed section 4 by controlling the drive section 6. Here, the image pickup section 7 images the interior of the image pickup section 7 before sheet paper is fed to the image pickup section 7 to acquire image data without any sheet paper. Subsequently, when the sheet paper is fed to the image pickup section 7, the image pickup section 7 images the sheet paper to acquire image data having the sheet paper and sends the image data without any sheet paper and image data having the sheet paper thus acquired to the identification section 9. When the identification section 9 receives the image data without any sheet paper and image data having the sheet paper, the received image data without any sheet paper and image data having the sheet paper are sent to the dust detection section 8. When the dust detection section 8 receives image data without any sheet paper and image data having the sheet paper, dust that is attached to the interior of the image pickup section 7 is sensed on the basis of the image data without any sheet paper and image data having the sheet paper. When the sensed dust is within the limits, the identification section 9 identifies the type and authenticity of the sheet paper on the basis of the image data having the sheet paper, and when the sheet paper is identified as an genuine bill, the control section 2 drives the sheet paper feed section 4 by controlling the drive section 6 such that the sheet paper is fed to the sheet paper receipt section 5 and the sheet paper is received and, when the sheet paper is identified as a counterfeit bill, the control section 2 drives the sheet paper feed section 4 by controlling the drive section 6 such that the sheet paper is fed to the sheet paper insert section 3 and the sheet paper is fed back. Further, when the dust detected by the dust detection section 8 falls outside the limits, a communication regarding the abnormal state of the image pickup section 7 is sent to the control section 2 and, upon receipt of the communication regarding the abnormal state, the control section 2 communicates the abnormal state of the image pickup section 7 to the control section of the main body (automated sale device, exchange device, or the like, for example) that houses the sheet paper identification device 1. Further, when the dust detected by the dust detection section 8 falls outside the limits, a constitution in which the identification section 9 identifies the sheet paper may be applied or a constitution in which the identification section 9 returns the sheet paper without identifying the sheet paper may be applied.

Figure 2:
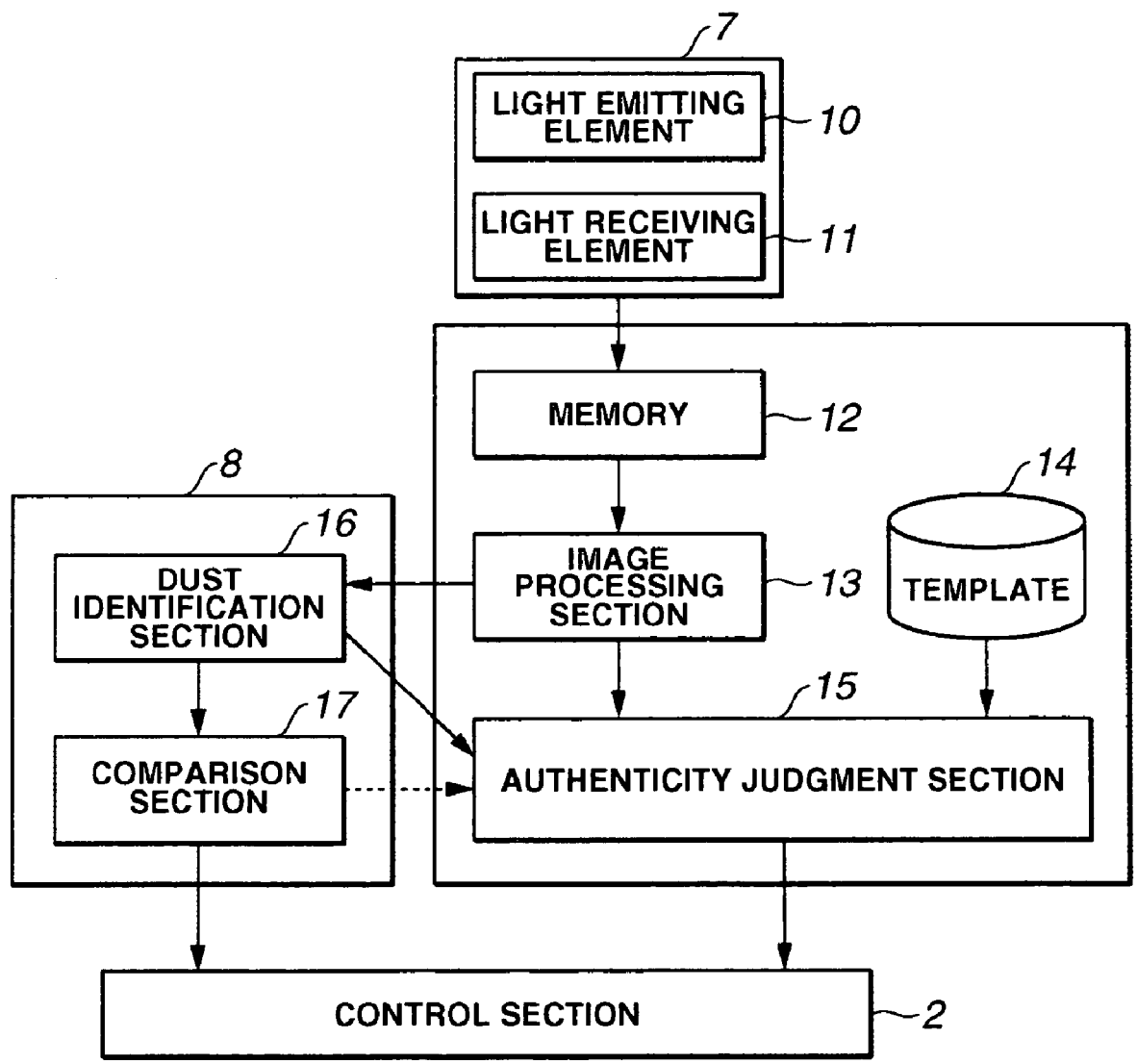
FIG. 2 is a block diagram showing an example of the functional constitution of the image pickup section, dust detection section, and identification section.

FIG. 2 is a block diagram showing an example of the functional constitution of the image pickup section 7, dust detection section 8, and identification section 9.

As shown in FIG. 2, the image pickup section 7 is constituted by a light emitting element 10 and a light-receiving element 11. The identification section 9 is constituted by a memory 12, an image processing section 13, a template 14, and an authenticity judgment section 15, and the dust detection section 8 is constituted by a dust identification section 16 and a comparison section 17.

Here, in the case of a constitution where the light-emitting element 10 irradiates light onto the sheet paper and the light-receiving element 11 receives transmitted light that has been transmitted by the sheet paper, the light-receiving element 11 and light-emitting element 10 are arranged in predetermined positions passing through a sheet paper imaging area that constitutes an identification target so that the sheet paper feed section 4 is interposed between the light-receiving element 11 and light-emitting element 10 and, when image data having the sheet paper is acquired, the light-emitting element 10 irradiates light onto the imaging area of the sheet paper that has been fed by the sheet paper feed section 4 and the light receiving element 11 receives transmitted light that has been transmitted by the imaging area of the sheet paper. An electrical signal is outputted in accordance with the amount of the transmitted light received. When image data without any sheet paper is acquired, the light-receiving element 11 receives the light irradiated by the light-emitting element 10 and an electrical signal is outputted in accordance with the amount of light received. Further, in the case of a constitution in which the light-emitting element 10 irradiates light onto the sheet paper and the light-receiving element 11 receives the reflected light reflected by the sheet paper, the light-emitting element 10 is disposed in a predetermined position passing through the imaging area of the sheet paper constituting the identification target and the light-receiving element 11 is disposed in a position that allows the reflected light reflected by the sheet paper to be received. Further, in order to acquire image data without any sheet paper, a reflective plate or the like that reflects the light of the light-emitting element 10 is disposed and, when image data having the sheet paper is acquired, the light-emitting element 10 irradiates light onto the imaging area of the sheet paper that has been fed by the sheet paper feed section 4 and the light-receiving element 11 receives reflected light that is rendered as a result of the sheet paper reflecting the imaging area. An electrical signal is outputted in accordance with the amount of the reflected light thus received and, when image data without any sheet paper is acquired, the light-emitting element 10 irradiates light and the light-receiving element 11 receives reflected light reflected through reflection of the reflective plate or the like. An electrical signal is outputted in accordance with the amount of reflected light thus received. Further, infrared, ultraviolet, or visible light can be applied to the image pickup section 7.

Further, the memory 12 temporarily stores and holds the signal levels of electrical signals that are outputted at regular time intervals by the image pickup section 7 as image data of the image pickup area of the sheet paper by allocating serial addresses that are stored in order in a predetermined storage area.

Further, the image processing section 13 reads image data without any sheet paper and image data having the sheet paper that are stored and held by the memory 12, binarizes the image data without any sheet paper and image data having the sheet paper thus read, sends the binary image data without any sheet paper and the image data having the sheet paper to the dust identification section 16 of the dust detection section 8, and sends the binary image data having the sheet paper to the authenticity judgment section 15.

Further, the dust identification section 16 detects an image showing the dust (dust attached to the interior of the image pickup section) of the binary image data without any sheet paper that has been thus received from the image processing section 13, measures the position and area of the dust image thus detected, compares the position and area of the measured dust image with binary image data having the sheet paper received from the image processing section 13. When an image with the same position and area as the image showing the dust exists in the binary image data having the sheet paper, the image is identified as the image showing dust that is attached to the interior of the image pickup section 7 in the image data having the sheet paper. The total area of the image showing dust thus identified is calculated, whereupon the calculated total area is sent to the comparison section 17 and the position and area of the image showing dust of the image data without any sheet paper are sent to the authenticity judgment section 15 of the identification section 9.

Further, the comparison section 17 compares the total area of the dust received from the dust identification section 16 with preset specified values and, when the total area of the dust falls outside the limits, the comparison section 17 sends a communication regarding the abnormal state of the image pickup section 7 to the control section 2. Further, a constitution in which a communication that identification of the sheet paper is not allowed is sent to the authenticity judgment section 15 of the identification section 9 when the total area of the dust falls outside the limits and a communication that identification of the sheet paper is allowed is sent to the authenticity judgment section 15 when the total area of the dust falls within the limits.

Further, the template 14 accumulates standard data that is found beforehand from the sheet paper of a genuine bill.

In addition, the authenticity judgment section 15 attaches an image showing the dust to the standard data read from the template 14 on the basis of the position and area of the image showing the dust received from the dust identification section 16, judges the type and authenticity of the sheet paper by comparing the standard data, to which the image of the dust has been attached, with image data having the sheet paper received from the image processing section 13, and sends the judgment results to the control section 2.

A functional operation performed by the image pickup section 7, dust detection section 8, and identification section 9 when the type and authenticity of the inserted sheet paper are identified will be described next.

The sheet paper inserted from the sheet paper insert section 3 is fed by the sheet paper feed section 4. The light-emitting element 10 irradiates light before the sheet paper reaches the image pickup section 7, the light-receiving element 11 receives the light or receives reflected light that is reflected by the reflective plate or the like, and an electrical signal is outputted to the memory 12 depending on the amount of received light. When the memory 12 inputs the electrical signal, the signal level of the inputted electrical signal is temporarily stored and held as image data without any sheet paper. When the sheet paper reaches the image pickup section 7, the light-emitting element 10 irradiates light onto the imaging area of the sheet paper and the light-receiving element 11 receives light that has been transmitted or reflected by the imaging area of the sheet paper. An electrical signal is outputted to the memory 12 depending on the amount of received light. When the memory 12 inputs the electrical signal, the signal level of the inputted electrical signal is temporarily stored and held as image data having the sheet paper. The image processing section 13 reads image data without any sheet paper and image data having the sheet paper that have been stored and held by the memory 12, binarizes the image data without any sheet paper and image data having the sheet paper thus read, sends binary image data without any sheet paper and binary image data having the sheet paper to the dust identification section 16 of the dust detection section 8, and sends binary image data having the sheet paper to the authenticity judgment section 15. Further, upon receiving the binary image data without any sheet paper and the binary image data having the sheet paper, the dust identification section 16 detects the position and area of the image showing the dust (dust attached to the interior of the image pickup section) of the binary image data without any sheet paper, measures the position and area of the image of the dust thus detected, and compares the measured position and area of the image of the dust with the binary image data having the sheet paper. When an image with the same position and area as the image showing the dust exists in the binary image data having the sheet paper, the image is identified as the image showing dust that is attached to the interior of the image pickup section 7 in the image data having the sheet paper, the total area of the image showing the dust thus identified is calculated, the calculated total area is sent to the comparison section 17, and the position and area of the image showing dust of the image data without any sheet paper are sent to the authenticity judgment section 15 of the identification section 9. Upon receiving the total area of the dust, the comparison section 17 compares the total area of the dust thus received with preset specified values. When the total area of the dust falls outside the limits, a communication regarding the abnormal state of the image pickup section 7 is sent to the control section 2. The authenticity judgment section 15 then reads standard data from the template 14, attaches the image showing the dust to the standard data on the basis of the position and area of the image showing the dust, judges the type and authenticity of the sheet paper by comparing the standard data, to which the image showing the dust has been attached, with the binary image data having the sheet paper received from the image processing section 13, and sends the comparison results to the control section 2.

Figure 3:
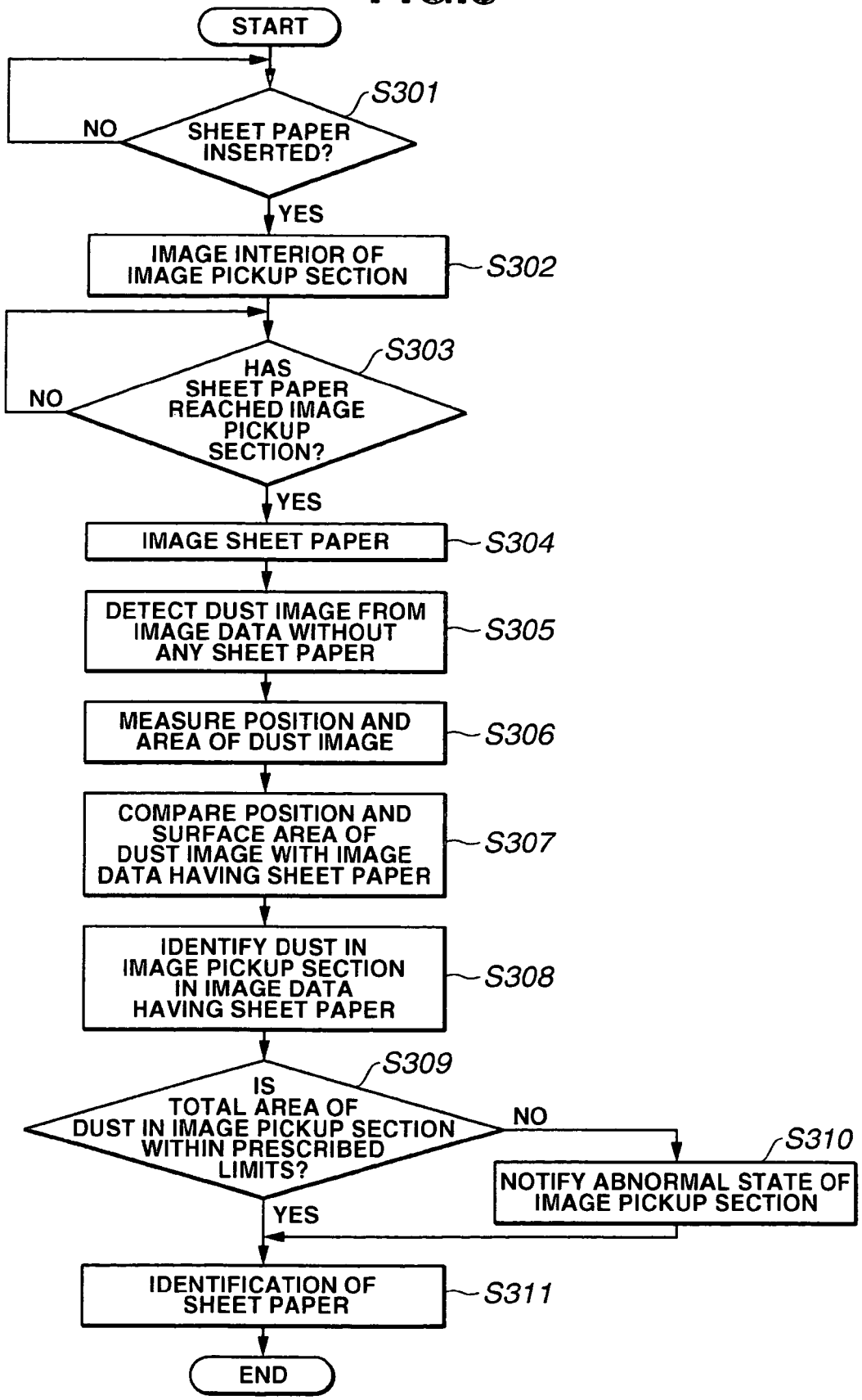
FIG. 3 is a flowchart showing the processing procedure performed by the sheet paper identification device when the type and authenticity of the inserted sheet paper is identified.

The processing procedure that is performed by the sheet paper identification device 1 when the type and authenticity of the inserted sheet paper are identified will be described next with reference to the flowchart shown in FIG. 3.

When sheet paper is inserted from the sheet paper insert section (YES in step S301), the sheet paper identification device images the interior of the image pickup section by means of the light-emitting element and light-receiving element (step S302) and, when the sheet paper reaches the image pickup section (YES in step S303), the sheet paper identification device images the sheet paper by means of the light-emitting element and light-receiving element (step S304), extracts an image showing dust from the image data without any sheet paper acquired by imaging the interior of the image pickup section (step S305), measures the position and area of the image showing dust thus extracted (step S306), compares the measured position and area of the image showing dust with the image data having the sheet paper (step S307), identifies the image showing dust attached to the interior of the image pickup section in the image data having the sheet paper (step S308) and, when the total area of the image showing dust attached to the interior of the image pickup section falls outside the limits (NO in step S309), the sheet paper identification device communicates the abnormal state of the image pickup section (step S310), identifies the sheet paper (step S311), and then ends the processing procedure.

Further, in step S309, when the total area of the image showing dust attached to the interior of the image pickup section is within the limits (YES in step S309), the sheet paper identification device identifies the sheet paper (step S311) and ends the processing procedure.

Further, in step S309, when the total area of the image showing dust attached to the interior of the image pickup section is outside the limits, the sheet paper identification device communicates the abnormal state of the image pickup section and can be applied even in a processing procedure in which the identification of the sheet paper is not performed.

Thereafter, where the sheet paper identification method of the present invention that is performed by the dust detection section 8 and identification section 9 is concerned, a constitution in which light is irradiated from the light-emitting element 10 onto a transparent area constituting the imaging area of sheet paper 18 and image data of the transparent area is acquired as a result of the light-receiving element 11 receiving transmitted light transmitted by the transparent area will be described in detail by way of an example.

Figure 4:
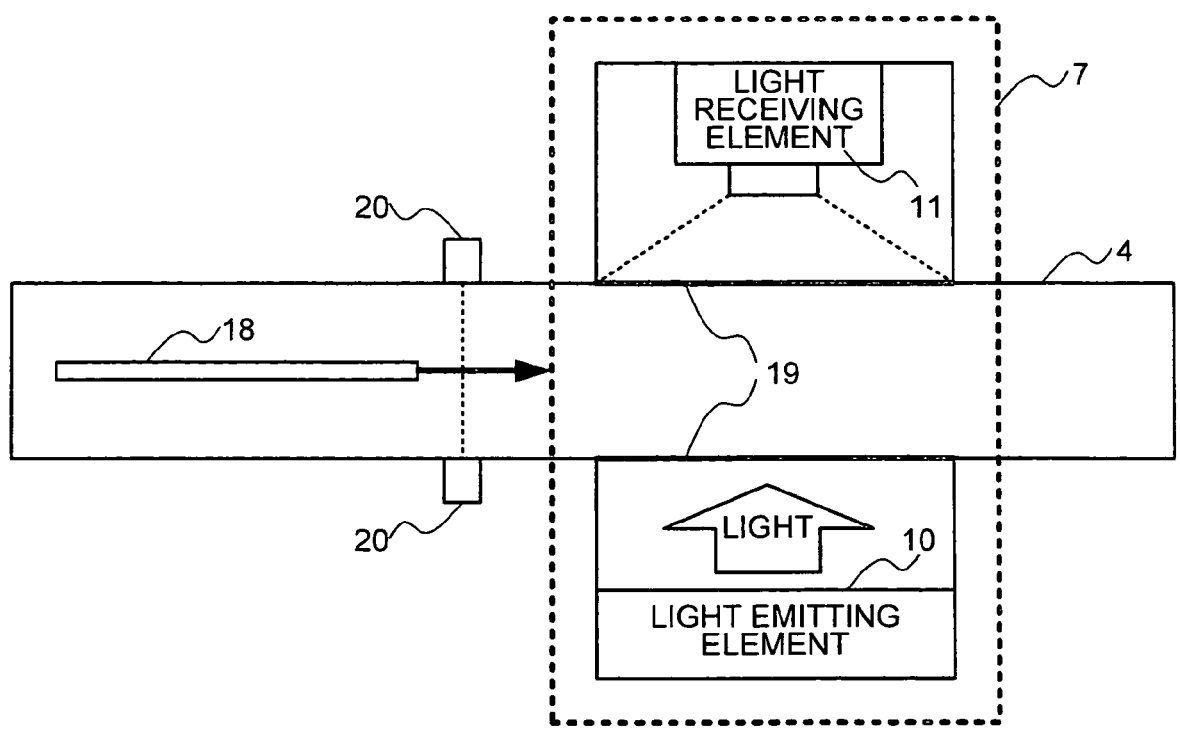
FIG. 4 shows an example of the detailed constitution of the image pickup section.

FIG. 4 shows an example of a detailed constitution of the image pickup section 7.

As shown in FIG. 4, the light-emitting element 10 and light-receiving element 11 are arranged in predetermined positions that pass through the transparent area of the sheet paper 18 which is to be identified such that the sheet paper feed section 4 is interposed between the light-emitting element 10 and light-receiving element 11, and the sheet paper feed section 4 of the image pickup section 7 is constituted by a transparent protective plate 19 or the like. Here, when a sheet paper sensing sensor 20, which is disposed between the sheet paper insert section 3 and image pickup section 7 senses the sheet paper 18 that has been fed by means of the sheet paper feed section 4, the light-emitting element 10 irradiates light and the light-receiving element 11 acquires image data without any sheet paper by receiving the light. Further, when it is recognized that the imaging area of the sheet paper 18 has reached the image pickup section 7 on the basis of the pulse or the like of the drive section 6, image data having the sheet paper is acquired as a result of the light-emitting element 10 irradiating light onto the transparent area of the sheet paper 18 and the light-receiving element 11 receiving transmitted light that is transmitted by the transparent area of the sheet paper 18.

Figure 5A:
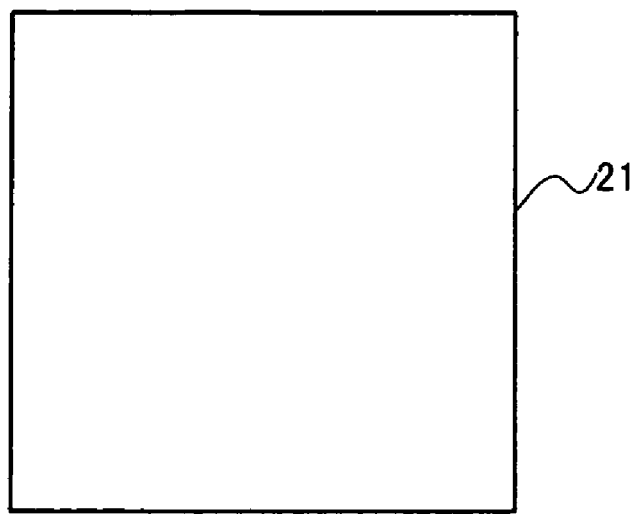
FIGS. 5(a) and 5(b) show an example of image data without any sheet paper and image data having the sheet paper that are acquired by means of the image pickup section shown in FIG. 4.
Figure 5B:
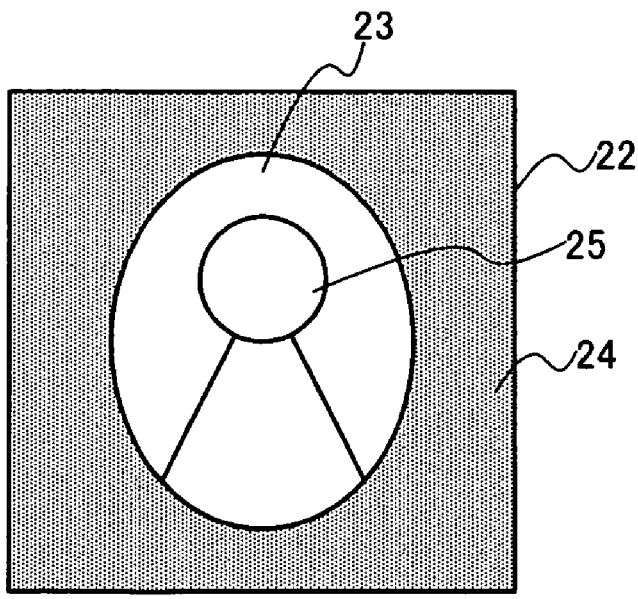

FIGS. 5(a) and 5(b) show an example of image data 21 without any sheet paper and image data 22 having the sheet paper that are acquired by means of the image pickup section 7 shown in FIG. 4.

FIG. 5(a) shows an example of the image data 21 without any sheet paper. As shown in FIG. 5(a), because imaging is performed before the sheet paper 18 reaches the image pickup section 7, no image exists in the image data 21 without any sheet paper.

FIG. 5(b) shows an example of the image data 22 having the sheet paper. As shown in FIG. 5(b), because the light-receiving element 11 receives transmitted light that has been transmitted by the transparent area of the sheet paper 18, a transparent area 23 and a normal area 24 excluding the transparent area 23 exist in the image data 22 having the sheet paper and a transparent pattern 25 exists in the transparent area 23. Here, the amount of light transmitted by the transparent area 23 is large, the amount of light transmitted by the transparent pattern 25 is smaller than the amount of light of the transparent area 23, and the amount of light transmitted by the normal area 24 is smaller than the amount of light of the transparent pattern 23.

Here, the image showing dust is not detected from the image data 21 without any sheet paper and it is therefore identified that no dust is attached to the image pickup section 7, whereby the type and authenticity of the sheet paper 18 is identified on the basis of the image data 22 having the sheet paper.

Figure 6:
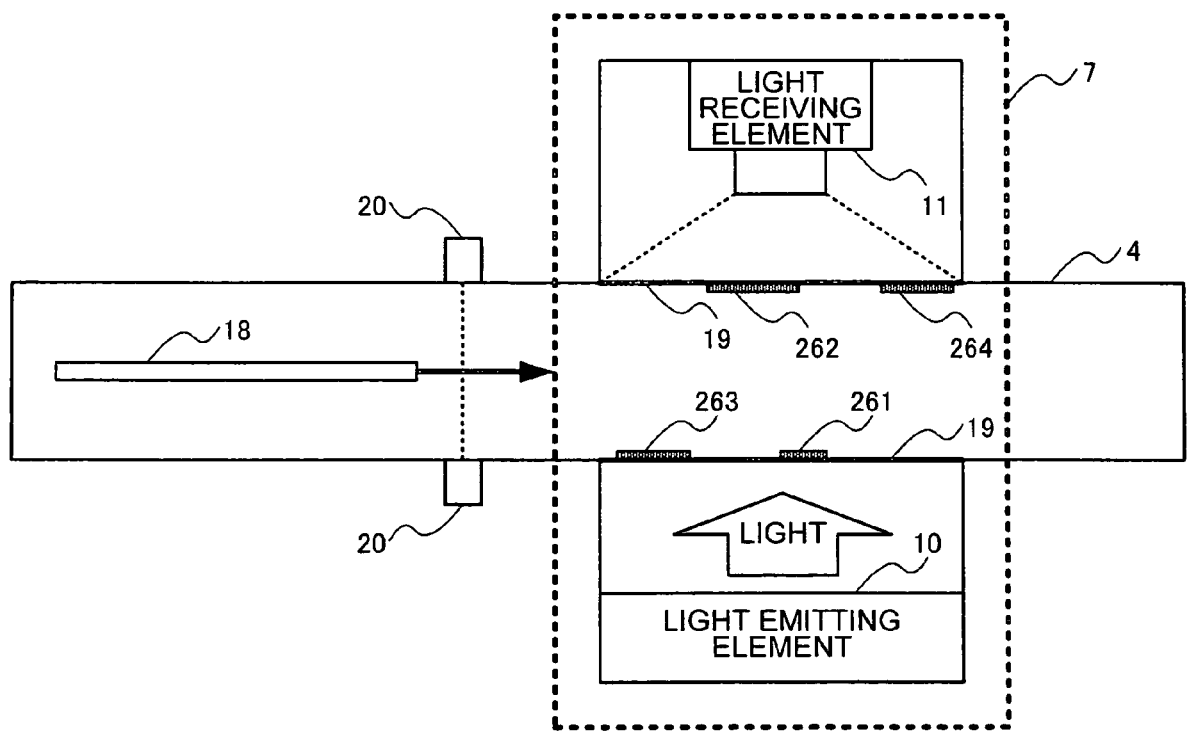
FIG. 6 shows an example of the detailed constitution of the image pickup section in a case where dust is attached to the interior of the image pickup section.

FIG. 6 shows an example of the detailed constitution of the image pickup section 7 when dust is attached to the interior of the image pickup section 7.

As shown in FIG. 6, the light-emitting element 10 and light-receiving element 11 are arranged in predetermined positions that pass through the transparent area 23 of the sheet paper 18 to be identified such that the sheet paper feed section 4 is interposed between the light-emitting element 10 and light-receiving element 11, and the sheet paper feed section 4 in the interior of the image pickup section 7 is constituted by the transparent protective plate 19 or the like. Here, dust A261 and dust C263 are attached to the protective plate 19 or the like on the side of the light-emitting element 10 and dust B262 and D264 are attached to the protective plate 19 or the like on the side of the light-receiving element 11.

Here, when the sheet paper sensing sensor 20 disposed between the sheet paper insert section 3 and image pickup section 7 senses the sheet paper 18 that has been inserted in the sheet paper feed section 4, the light-emitting element 10 irradiates light and the light-receiving element 11 acquires image data without any sheet paper by receiving the light. Further, when it is recognized that the transparent area 23 of the sheet paper 18 has reached the image pickup section 7 on the basis of the pulse or the like of the drive section 6, the light-emitting element 10 irradiates light onto the transparent area 23 of the sheet paper 18 and the light-receiving element 11 acquires image data having the sheet paper by receiving transmitted light transmitted by the transparent area 23 of the sheet paper 18 FIGS. 7(a) and 7(b) show an example of image data 27 without any sheet paper and image data 28 having the sheet paper that are acquired by the image pickup section 7 shown in FIG. 6.

Figure 7A:
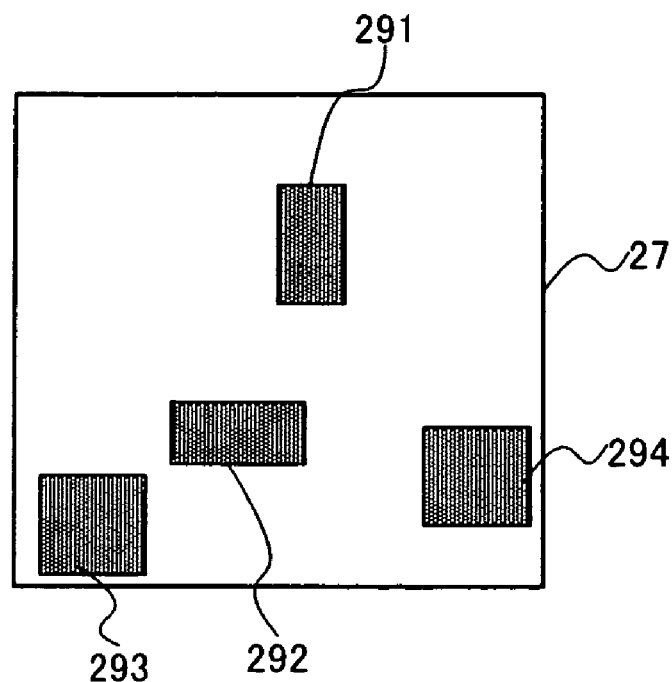
FIGS. 7(a) and 7(b) show an example of image data without any sheet paper and image data having the sheet paper that are acquired by means of the image pickup section shown in FIG. 6.

FIG. 7(a) shows an example of the image data 27 without any sheet paper. As shown in FIG. 7(a), a dust image A291, dust image B292, dust image C293, and dust image D294 exist in the image data 27 without any sheet paper.

Figure 7B:
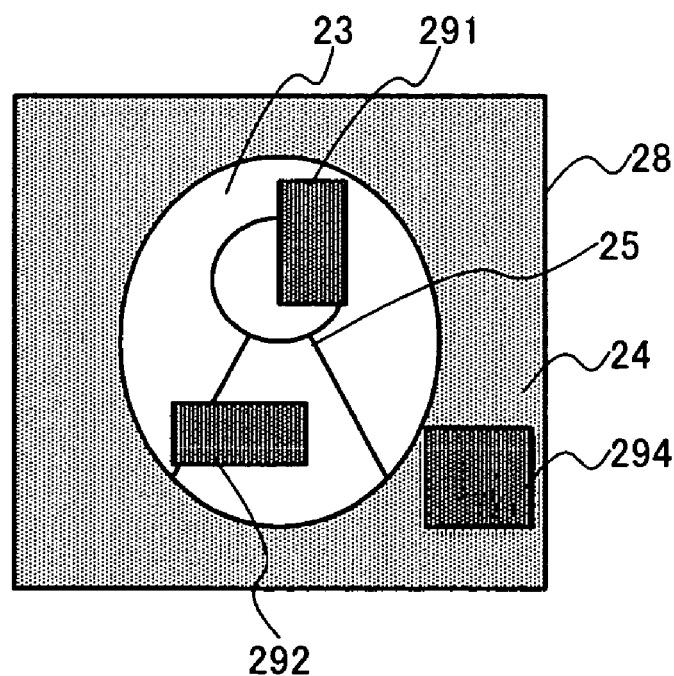

FIG. 7(b) shows an example of the image data 28 having the sheet paper. As shown in FIG. 7(b), the transparent area 23 and the normal area 24 excluding the transparent area 23 exist in the image data 28 having the sheet paper, a transparent pattern 25 exists in the transparent area 23, and the dust image A291, dust image B292, and dust image D294 are present. Here, the dust C263 is attached to the protective plate 19 on the side of the light-emitting element 10 and is attached in a position that passes through the normal area 24 through which the amount of light transmitted is small. Therefore, the dust image C293 does not exist in the image data 28 having the sheet paper.

Figure 8A:
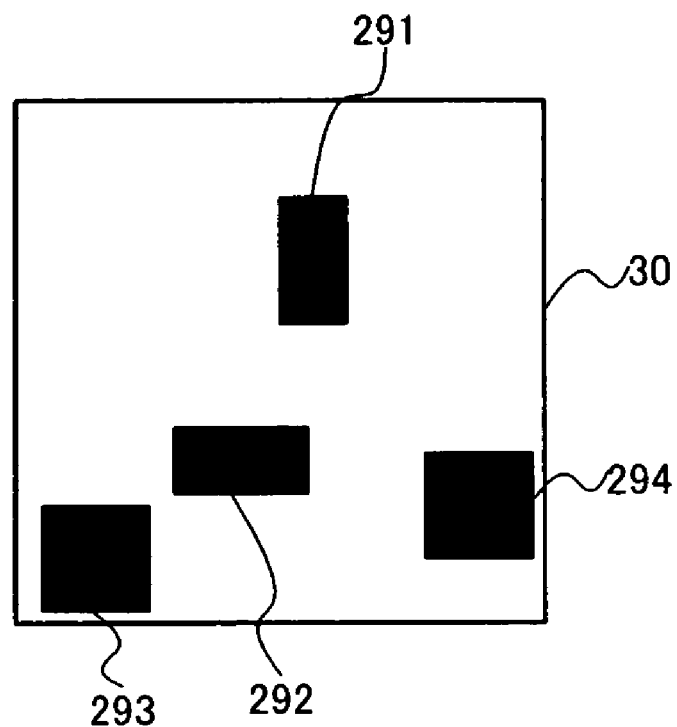
FIGS. 8(a) and 8(b) show an example of binary image data without any sheet paper and binary image data having the sheet paper that are rendered by binarizing the image data without any sheet paper and image data having the sheet paper shown in FIG. 7.
Figure 8B:
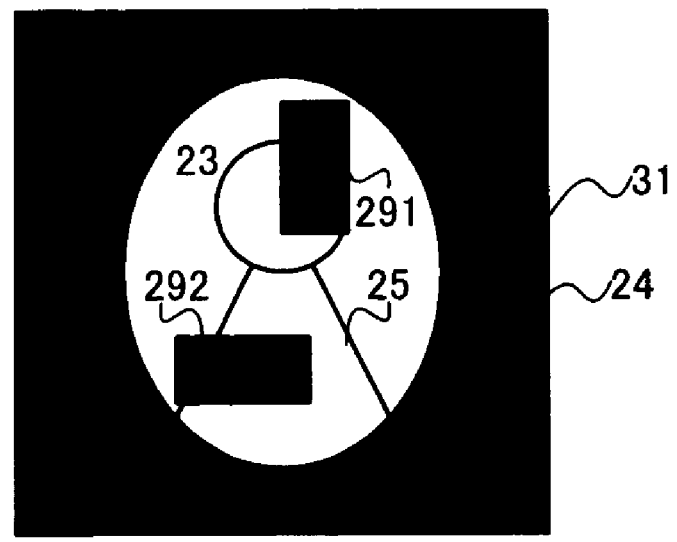

FIGS. 8(a) and 8(b) show an example of binary image data 30 without any sheet paper and binary image data 31 having the sheet paper that are rendered by binarizing the image data 27 without any sheet paper and image data 28 having the sheet paper shown in FIGS. 7(a) and 7(b).

FIG. 8(a) shows an example of binary image data 30 without any sheet paper that is rendered by binarizing the image data 27 without any sheet paper shown in FIG. 7. As shown in FIG. 8(a), by binarizing the image data 27 without any sheet paper shown in FIG. 7, the dust image A291, dust image B292, dust image C293 and dust image D294 become black pixels.

FIG. 8(b) shows an example of binary image data 31 having the sheet paper that is rendered by binarizing the image data 28 having the sheet paper shown in FIG. 7. As shown in FIG. 8(b), by binarizing the image data 28 having the sheet paper shown in FIG. 7, the transparent area 23 becomes white pixels, the transparent pattern 25 and normal area 24 become black pixels, and the dust image A291 and dust image B292 become black pixels. Here, although the dust image D294 becomes black pixels through binarization, the dust D294 is located such that same blocks the normal area 24. As a result, the dust image D294 is conjoined with the normal area 24 and can no longer be identified.

Here, when the binary image data 30 without any sheet paper and the binary image data 31 having the sheet paper are compared, it can be seen that the dust image A291 and dust image B292 that exist in the binary image data 30 without any sheet paper and the dust image A291 and dust image B292 that exist in the binary image data 31 having the sheet paper are in the same positions and have the same area. The dust image A291 and dust image B292 that exist in the binary image data 31 having the sheet paper can be identified as being the dust A261 and dust B262 that are attached to the interior of the image pickup section 7.

Therefore, dust that is attached to the interior of the image pickup section 7 and dust or scratches or the like that exist in the sheet paper 20 can be identified.

The total area of the dust image A291 and dust image B292 is then calculated and, when the total area thus calculated is greater than a preset specified value, the abnormal state of the image pickup section 7 is communicated. Further, in a constitution in which the image data of the transparent area 23 is acquired, only dust that is attached in a position that passes through the transparent area 23 of the sheet paper 18 can be identified and, therefore, a comparison with the specified value is possible by calculating only the total area of the dust attached in a position that passes through the transparent area 23. Even when a large amount of dust is attached to the interior of the image pickup section 7, for example, as long as the quantity of dust attached in positions that pass through the normal area 24 of the sheet paper 18 is large and the quantity of dust attached in a position passing through the transparent area 23 is small, the abnormal state of the image pickup section 7 need not be communicated.

Figure 9:
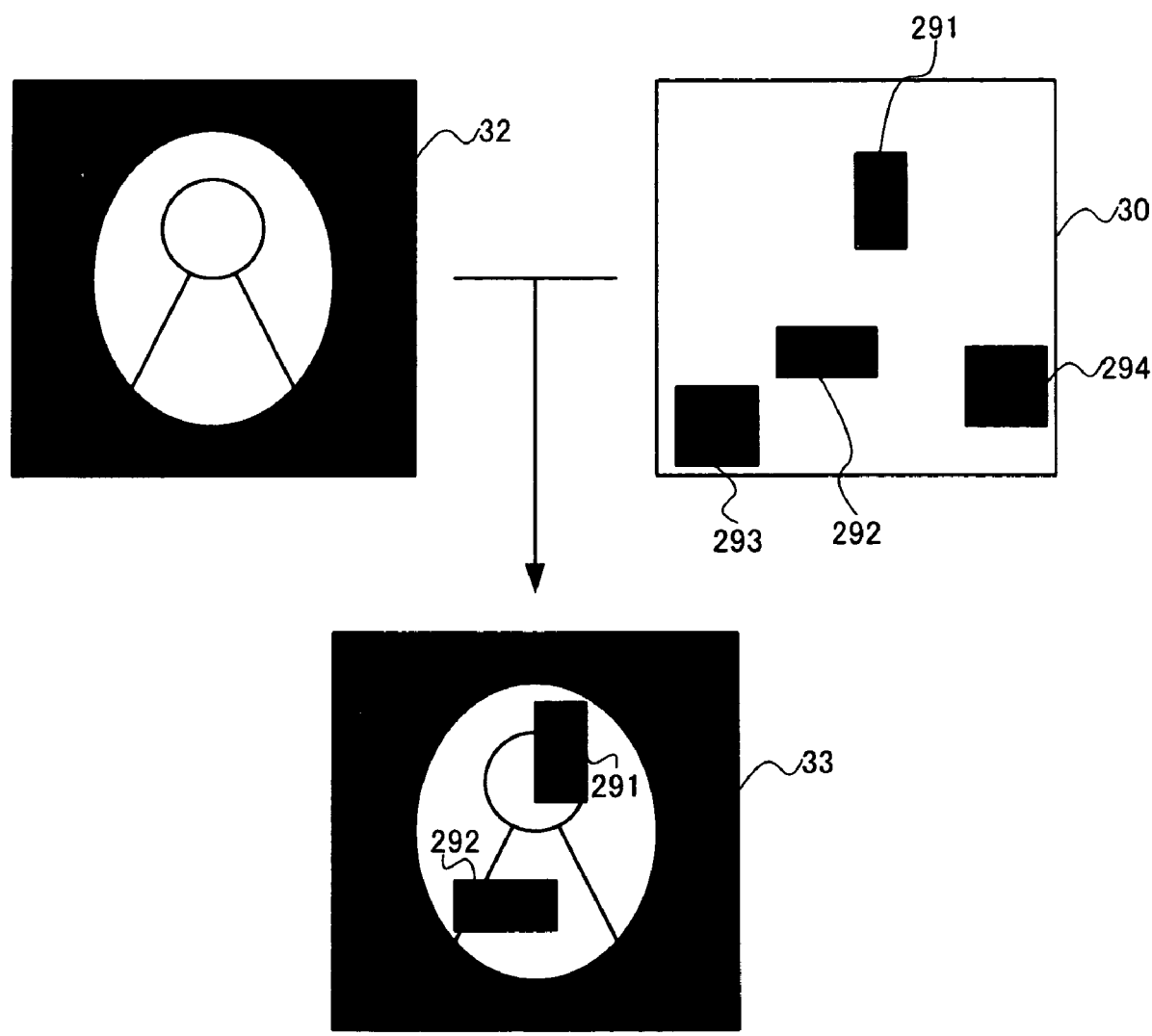
FIG. 9 illustrates an example of processing in which a dust image that exists in the binary image data without any sheet paper shown in FIG. 8 is attached to the standard data.

FIG. 9 shows an example of processing in which a dust image that exists in the binary image data 30 without any sheet paper shown in FIG. 8 is attached to standard data 32.

As shown in FIG. 9, the dust image A291, dust image B292, dust image C293, and dust image D294 that exist in the binary image data 30 without any sheet paper shown in FIG. 8 are attached to the standard data 32 found beforehand from sheet paper of a genuine bill in the same positions and over the same area, and standard data 33 to which the dust images have been attached is generated.

Further, by comparing the standard data 33 to which the dust images have been attached with binary image data 31 having the sheet paper shown in FIG. 8, the type and authenticity of the sheet paper 18 are identified. Thus, the processing to attach the dust images that exist in the binary image data 30 without any sheet paper to the standard data 32 in the same positions and over the same area is straightforward image processing in comparison with processing to erase dust images from the binary image data 31 having the sheet paper, and the effects of dust images on the identification of the sheet paper 18 can be reduced.

Further, although a constitution in which dust attached to the interior of the image pickup section is detected by acquiring image data without any sheet paper each time the sheet paper is inserted was described in the above embodiment, the use of a constitution in which detection of dust attached to the image pickup section 7 is performed at regular intervals can also be applied.

Furthermore, where the actual sheet-paper identification processing is concerned, the final conclusions on identification may be drawn in combination with other identification primary factors without identifying the type and authenticity of the sheet paper by means of the sheet paper identification method according to the present invention alone.

INDUSTRIAL APPLICABILITY

The present invention can be applied to a sheet paper identification device that images an image of sheet paper such as a bill by means of an image pickup section and performs identifies the sheet paper on the basis of the image thus imaged. According to the present invention, the interior of the image pickup section is imaged before imaging the sheet paper and, by correctly imaging the dust attached to the interior of the image pickup section, erroneous identification number that arises as a result of dust being attached can be prevented and, by detecting the abnormal state of the interior of the image pickup section and communicating the abnormal state to the outside, use of the image pickup section in the abnormal state can be prevented.

The invention claimed is:

1. A sheet paper identification device that images an image of sheet paper by means of an image pickup section located on a feed path for the sheet paper and identifies the sheet paper on the basis of image data of the sheet paper thus imaged and acquired, comprising:
   image data acquisition means for acquiring sheet-paper-absent image data imaged and acquired by the image pickup section in a state where sheet paper has not yet arrived at the image pickup section and there is no sheet paper, and sheet-paper-present image data imaged and acquired in a state where sheet paper has arrived at the image pickup section and there is the sheet paper;
   measurement means for measuring a position and area of an image in the sheet-paper-absent image data acquired by the image data acquisition means;
   unwanted image discrimination means for discriminating an image that exists in the sheet-paper-present image data in the same position and over the same area as the image in the sheet-paper-absent image data measured by the measurement means as an unwanted image; and
   sheet paper identification means for attaching the unwanted image discriminated by the unwanted image discrimination means to standard data found beforehand from genuine sheet paper in the same position and over the same area as the unwanted image, and identifying the authenticity of the sheet paper by comparing the standard data to which the unwanted image is attached with the sheet-paper-present image data.

2. The sheet paper identification device according to claim 1, wherein
   the unwanted image discrimination means binarizes the sheet-paper-absent image data and the sheet-paper-present image data that are acquired by the image data acquisition means, and identifies the image existing in the binarized sheet-paper-present image data in the same position and over the same area as the image in the sheet-paper-absent image data as the unwanted image.

3. The sheet paper identification device according to claim 1, wherein
   the sheet paper identification means identifies the sheet paper on the basis of the sheet-paper-present image data acquired by the image data acquisition means in a case where the total area of the unwanted image discriminated by the unwanted image discrimination means is within a predetermined value.

4. The sheet paper identification device according to claim 2, wherein
   the sheet paper identification means identifies the sheet paper on the basis of the sheet-paper-present image data acquired by the image data acquisition means in a case where the total area of the unwanted image discriminated by the unwanted image discrimination means is within a predetermined value.

5. A sheet paper identification method that images an image of sheet paper by means of an image pickup section located on a feed path for the sheet paper and identifies the sheet paper on the basis of image data of the paper sheet thus imaged and acquired, comprising:
   acquiring, by image data acquisition device, sheet-paper-absent image data imaged and acquired by the image pickup section in a state where sheet paper has not yet arrived at the image pickup section and there is no sheet paper, and sheet-paper-present image data imaged and acquired in a state where sheet paper has arrived at the image pickup section and there is the sheet paper;
   measuring, by measurement device, a position and area of an image in the sheet-paper-absent image data acquired by the image data acquisition device;
   discriminating, by unwanted image discrimination device, an image that exists in the sheet-paper-present image data in the same position and over the same area as the image in the sheet-paper-absent image data measured by the measurement device as an unwanted image; and
   attaching, by sheet paper identification device, the unwanted image discriminated by the unwanted image discrimination device to standard data found beforehand from genuine sheet paper in the same position and over the same area as the unwanted image, and identifying the authenticity of the sheet paper by comparing the standard data to which the unwanted image is attached with the sheet-paper-present image data.

6. The sheet paper identification method according to claim 5, wherein
   the unwanted image discrimination device binarizes the sheet-paper-absent image data and the sheet-paper-present image data that are acquired by the image data acquisition device, and identifies the image existing in the binarized sheet-paper-present image data in the same position and over the same area as the image in the sheet-paper-absent image data as the unwanted image.

7. The sheet paper identification method according to claim 5, wherein
   the sheet paper identification device identifies the sheet paper on the basis of the sheet-paper-present image data acquired by the image data acquisition device in a case where the total area of the unwanted image discriminated by the unwanted image discrimination device is within a predetermined value.

8. The sheet paper identification method according to claim 6, wherein
   the sheet paper identification device identifies the sheet paper on the basis of the sheet-paper-present image data acquired by the image data acquisition device in a case where the total area of the unwanted image discriminated by the unwanted image discrimination device is within a predetermined value.

* * * * *